3,117,571
PRODUCTION OF REVERSIBLE CHANGES IN LIVING TISSUE BY ULTRASOUND
William J. Fry and Frank J. Fry, Champaign, Ill., assignors to University of Illinois Foundation
No Drawing. Filed Feb. 28, 1957, Ser. No. 642,964
3 Claims. (Cl. 128—24)

This invention is concerned with producing reversible changes in living tissue such as the central nervous system with a minimum amount of any surgery and without the use of drugs or other chemical agents. More specifically this invention provides for such changes at practically any localized region of the tissue of any specified size and shape. These changes can be produced at deep sites within the brain for example, without producing changes in the tissue between the surface and the site or region at which the change is desired. Intervening bone may sometimes require removal.

According to this invention, localized reproducible reversible changes can be produced by focusing a beam or beams of ultrasound into the area to be affected. By proper control of the ultrasonic dosage, it is possible to produce changes of reversible nature. Irreversible changes of a selective nature by controlled ultrasonic dosages can be produced as disclosed in the copending patent application, Serial No. 554,607, filed by William J. Fry and Frank J. Fry on December 22, 1955.

In order to localize the focus of a beam of ultrasound or produce a common focus of a multiplicity of beams to produce an irreversible change at a desired locus in the living tissue or nervous system for example, it has been necessary up to the time of this invention to locate or place the common focus of the beams by reference to certain landmarks. These landmarks may include, for example, the air-filled ventricles of the brain or the only landmarks on the exterior surface of the skull such as the infra-orbital ridges (below the eyes) and the midpoint of the line through the ear canals. Although such landmarks are of great assistance in positioning the focus of an ultrasonic beam, hypodermic needle, or electrically heated probe at a desired site in the brain, the procedure leaves much to be desired. The positions of the various nuclei and fiber tracts of the brain vary somewhat in position with respect to these landmarks. The brains of different individuals vary somewhat in size and shape. A series of maps of the anatomical structures can be made for two or more shapes of skulls but the use of such maps entails interpolation procedures since only a very small fraction of all human skulls would fit the maps closely. A procedure which would eliminate the necessity of depending solely on the maps prepared with reference to specific landmarks is of great advantage.

This invention also provides a technique which makes possible the final accurate location of a region of the brain associated with a specific function independent of landmarks such as those described above. By sweeping the focus of an ultrasonic beam or beams through a region of the brain at a level and duration of exposure less than that required to produce an irreversible change, it is possible to localize regions associated with specific functions or activities of the central nervous system.

For example, if one of the eyes is exposed to flashes of light (the other eye being covered) and electrodes are placed on the visual cortex, it is possible to identify an electrical signal at the electrodes following each flash of light. By focusing an ultrasonic beam upon a portion of the nerve pathway which leads from the eye to the visual cortex, it is possible to reversibly suppress the transmission of nerve impulses along this pathway. By sweeping the focus of the beams about, it is thus possible to localize by ultrasound regions in the brain which are involved in the transmission of the nerve impulses from the eye to the cortex.

Another example may serve further to clarify the applicability of this reversible procedure. If an individual with Parkinson's disease is irradiated with a focused beam or beams of ultrasound at a specific site in the brain (the fiber tracts leading from the nucleus deep in the midbrain) at an ultrasonic dosage, which is less than that required for permanent change (irreversible change), it is possible to suppress the tremor of the individual on the same side by sweeping the focus of the ultrasonic beam through the fiber region at a rate such that suppression of nerve impulses along the fiber pathway is realized. When the precise region associated with the suppression of the tremor is located by moving the focus of the ultrasound, it is then possible to raise the ultrasonic dosage at these loci and so produce a change in this tissue sufficient to suppress the tremor permanently.

By precise control of the ultrasonic radiation conditions using either pulsed or continuous radiation, it is possible to eliminate the difficulties heretofore experienced in attempting to precisely locate a given anatomical structure or region with reference to either external or internal landmarks of the type described above.

By ultrasound, it is meant frequencies above those heard by the human ear, that is above about 20 kc. Frequencies of the order of 1 mc./sec. have been found satisfactory for the production of reversible changes. The sound must be transmitted from the transducer to the subject by a material which does not contain gas cavities or which does not include a gas path. This is necessary because of the reflection of ultrasound which occurs at a liquid-gas or solid-gas interface. It is possible to use sound levels of the same order as those required to produce irreversible changes, but the dosages must be of shorter duration. By appropriate spacing in time it is possible to repeat the exposure any desired number of times. It is also possible to use sound levels for producing reversible changes below those at which irreversible changes of a selective nature are produced by irradiating the tissue for a much longer continuous period of time.

This invention may be carried out by the following apparatus: The ultrasound may be produced by a single transducer provided with a lens or reflecting surface for focusing. This transducer can be driven electronically by RF amplifiers. It is also possible to use a device consisting of a plurality of transducers, provided either with lenses or a set of reflecting surfaces which focus or localize the acoustice energy produced by a single or multiple array of vibrating element. The reflector method of localizing the acoustic energy is distinctly different from the lens method. A reflector instrument, for example, can be designed to substantially confine the acoustic energy to a portion or portions of the space between two surfaces (not enclosing the other) with a common axis. As such, the reflector method may be considered as a plurality of individual beams. If the entire space between the surfaces is involved in the transmission of the acoustic energy, this is the limiting case of a plurality of individual beams.

An electronic switch may be inserted between the signal generator and the amplifier for controlling the duration and time sequence of the acoustic radiation. This may be varied in steps of, for example, 0.001 second. The apparatus is preferably designed so as to enable a sequence of acoustic pulses to be produced. The interval between pulses can be controlled in duration in steps of, for example, 0.001 second. If test stimuli are to be employed (for example, light flashes), it is possible to synchronize these stimuli in any time relation with respect to the initiation of the acoustic pulses. Observation of the responses following stimulation can be made and/or recorded. For example, electrical responses may be recorded on an electroencephalograph or on the face of an oscilloscope.

Four transducers as sources for the ultrasonic beams have been employed successfully in one embodiment of an apparatus. Such a transducer is shown in the copending application, Serial No. 599,054, filed by William J. Fry and Frank J. Fry on July 20, 1956, and now Patent No. 2,968,302. Each transducer consists of an X-cut quartz crystal which vibrates at resonance and is mounted in a housing supporting a focusing polystyrene lens. Water, oil, or an adhesive may serve as the coupling medium between the crystal and lens. Obviously, instead of using lenses to form the beams, reflector systems could be used to obtain similar results. Means are provided for adjusting the position of the focal region of each transducer. The acoustic pressure amplitude and acoustic particle velocity or other acoustic variables can be adjusted by varying the driving voltage and phase adjustments with which the transducers are provided. A beam of, for example, 1.5 mm. diameter (width at 0.7 of the particle velocity amplitude at the peak) can readily be produced at a frequency of one megacycle per second and has been found satisfactory for much of the work. All transducers can be focused into a common region. The multiple focusing beam type irradiator provides an ultrasonic beam the level of which decreases very rapidly in directions away from the joint focal region.

The transducers are so mounted that the common focal region may be moved by the operator in the directions of the three rectangular coordinates and the axis of the beams may be oriented in a variety of angular directions. Such a mounting is disclosed in the copending application, Serial No. 590,695, filed by Frank J. Fry and Leroy L. Dreyer on June 11, 1956, and now abandoned.

To treat the tissue by focused or localized and controlled ultrasonic beams, the latter are first adjusted as to focus or locus and calibrated at a given point (usually at the beam maximum acoustic level). The tissue such as a portion of the brain of a mammal to be treated is supported in position in a suitable headholder, such as that shown in the copending application, Serial No. 599,806, filed by Frank J. Fry on July 24, 1956, and now abandoned. The specimen is then prepared, for example, for brain irradiation by incising the soft tissues and removing the portion of the skull in the path which is to be taken by the focused beam to reach the region to be irradiated. (If bone is not present in the path that the beam must traverse, the skin need not be opened.) Since sterile salt water can be used to conduct the sound from the transducers to the tissue, it is desirable to remove the intervening bone since this procedure assures that very little reflection of acoustic energy takes place when the sound leaves the salt water and enters the biological specimen. This procedure also eliminates the bone-soft tissue interfaces at which considerable refraction of the sound occurs if the ultrasonic beams are incident on the interface at an angle to the normal of the interface. The procedure also eliminates the difficulties associated with the high absorption of the sound by bone which results in considerable heating. The dura matter need not be opened. In practice, it has been found practical in cases when the skin is incised to utilize a pan large enough to receive the irradiator and having a flanged opening through the bottom to which the skin (around the opening at the skull, for example) may be secured as a means for retaining the salt water.

Irradiation can then proceed under the desired conditions. The depth in the tissue at which the change is desired can be set approximately by setting the irradiator vertical at a position determined by using landmarks, such as those described above. Lateral and longitudinal placement of the tissue to be treated can be set approximately in the same fashion. When the position of the focus of the ultrasonic beam or beams is thus approximately determined, several procedures can be followed, depending upon the desired results. If, for example, it is desired to accurately locate a tissue in which reversible change is to be produced, a sweeping procedure can be initiated. The coordinate positioning system which includes motor drives for each direction, can be controlled to move in a prescribed fashion so as to move the focus of the ultrasonic beams in a prescribed path so that the focus covers a prescribed region or volume of tissue. While the coordinate positioning system is so moving, the transducers can be producing sound continuously or emitting pulses of a specified duration and with a specified interval between successive pulses. The acoustic dosage may be gradually increased until the single manifestation of the organism is either suppressed or elicited. If no change occurs at levels which should accomplish such changes (as determined by previous animal experimentation) then the center of the swept region can be moved to a new location and the procedure repeated. In this fashion, the region of the brain associated with a particular function can be located. When the region is located, the acoustic dosage conditions can be adjusted so that an irreversible change is produced in the tissue if such is desired.

An alternate procedure which can be used is to fix the position of the focus of the ultrasonic beams and with an ultrasonic dosage condition sufficient to produce reversible change, irradiation is carried out with the focus in a fixed position. If no change occurs after a suitable period of time, irradiation is discontinued, the focus is moved to a new location, and the procedure repeated. In this fashion a map of a volume of brain tissue can be obtained and localization of function or of pathways associated with specific functions can be located or traced in the interior of the brain.

As previously stated, sound frequencies of the order of one megacycle per second have been used with marked success. Either the acoustic particle velocity amplitude has been equal to or greater than 10 cm./sec. or the acoustic pressure amplitude has been equal to or greater than 2 atmospheres. In the practice of this invention it has been demonstrated that changes produced of a reversible nature as described by changes in the behaviour or by changes in function of the nervous system are not accompanied by histological evidence of a lesion.

Obviously, the apparatus described is only typical of apparatus that may be used to carry out this invention and that specific examples of the changes which can be produced are merely illustrative of the apparatus and other changes as well as a variety of dosage conditions will be readily conceivable for those skilled in this art without departing from the spirit and scope of the invention and without departing from the spirit of the claims.

It is claimed:

1. The method of targeting a region associated with functions of interest in living tissue for ultrasonic irradiation which comprises predetermining the nature of a nervous activity to be modified, focusing ultrasonic beam energy upon a selected volume within said region, maintaining the focused beam energy within the volume until for a time period sufficient to reversibly modify said nervous activity, determining whether the said nervous activity has been modified, and, if not, moving the focused beam energy to a second volume within the region, again maintaining the focused ultrasonic beam energy within the second volume for a time period sufficient to reversibly modify the nervous activity, and repeating the steps until a volume is reached within the region in which the predetermined nervous function is reversibly modified, and subsequently continuing the application of the focused ultrasonic beam to that volume until the modification of nervous activity therefrom is irreversible.

2. The method of targeting a functional region of interest in living tissue for ultrasonic irradiation treatment which comprises predetermining the nature of a nervous activity to be arrested, focusing ultrasonic beam energy within and upon a selected volume within said region, maintaining the focused beam within the volume until nervous activity therefrom has been reversibly modified, moving the ultrasonic beam energy impact to a spaced second volume within the said region and again maintaining the focused beam irradiation within the second selected volume for a time sufficient to reversibly modify nervous activity at the second volume, repeating the steps until the volume irradiated within said region provides reversible modification of the selected nervous function for which treatment is initiated, and subsequently continuing the application of the focused ultrasonic beam to the treated volume until the modification of the nervous activity therefrom is irreversible without irreversibly affecting the nervous activity from other regions traversed by the beam.

3. The method of targeting a functional region of interest in living tissue for ultrasonic irradiation treatment which comprises predetermining the nature of a nervous activity to be arrested, focusing a plurality of spaced ultrasonic beams within and upon a selected volume within said region, maintaining the plurality of spaced ultrasonic beams focused at the selected volume within the region until nervous activity therefrom has been reversibly modified, determining the nature of the nervous activity as reversibly modified, moving all of the plurality of focused irradiating beams to a spaced second volume within said region, maintaining the plurality of focused irradiating beams within the second volume until nervous activity therefrom has also been reversibly modified and repeating the steps until a volume is reached within said region in which the nervous activity modified is that sought for treatment, and subsequently continuing the application of the focused beams to that volume until the modification of nervous activity therefrom is irreversible and regions between entry of the irradiation within the tissue and the treated volumes are substantially unaffected by the exciting irradiation.

References Cited in the file of this patent

Electronics, July 1955, pages 164 and 166. (Copy in Scientific Library.)

Journal of General Physiology, vol. 26; pages 179–192; 1942–1943. (Copy in Div. 55.)